United States Patent

[15] 3,707,031

Hall

[45] Dec. 26, 1972

[54] METHOD OF MAKING TUNED TORSIONAL VISCOUS VIBRATION DAMPERS

[72] Inventor: Jeffrey Hall, Huddersfield, England

[73] Assignee: Houdaille Industries, Inc., Buffalo, N.Y.

[22] Filed: April 5, 1971

[21] Appl. No.: 131,481

Related U.S. Application Data

[62] Division of Ser. No. 780,779, Dec. 3, 1968, Pat. No. 3,603,172.

[30] Foreign Application Priority Data

Dec. 12, 1967 Great Britain.....................56,365/67

[52] U.S. Cl. ......................29/455, 29/460, 264/262
[51] Int. Cl..........................B21d 39/00, B23p 19/04
[58] Field of Search ........29/455, 460, 445; 264/262; 74/574; 188/1 B

[56] References Cited

UNITED STATES PATENTS

| | | | |
|---|---|---|---|
| 2,686,091 | 8/1954 | Young | 29/460 UX |
| 3,059,898 | 10/1962 | Carlson et al. | 29/445 UX |
| 3,200,485 | 8/1965 | McGavern | 74/574 X |
| 3,448,830 | 6/1969 | Desmond | 74/574 X |
| 3,461,529 | 8/1969 | Van Dorn | 264/262 X |

FOREIGN PATENTS OR APPLICATIONS 122,320  10/1946  Australia............................264/262

Primary Examiner—Charlie T. Moon
Attorney—Carlton Hill et al.

[57] ABSTRACT

A tuned torsional viscous vibration damper is made by bonding elastic spacer and tuning material to, and in the space between, torsionally movable members one of which is an inertia mass, assembling additional structure with the members to provide an enclosed working chamber, engaging a spacer of the material between working surfaces of the structure and one member, and filling viscous damping fluid into the working chamber and between said surfaces.

14 Claims, 4 Drawing Figures

PATENTED DEC 26 1972 3,707,031
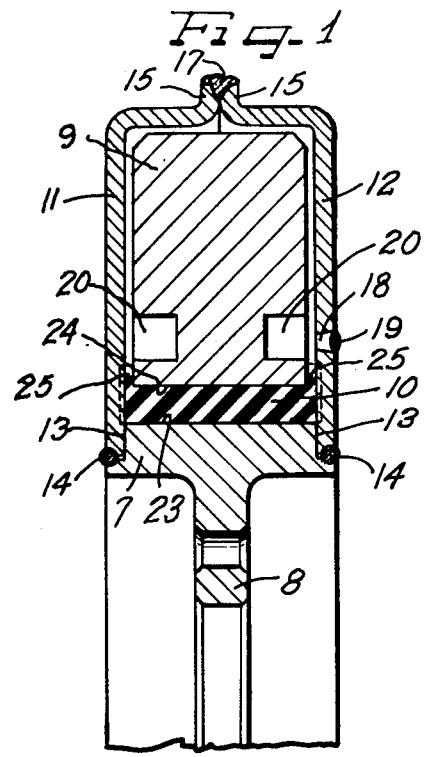
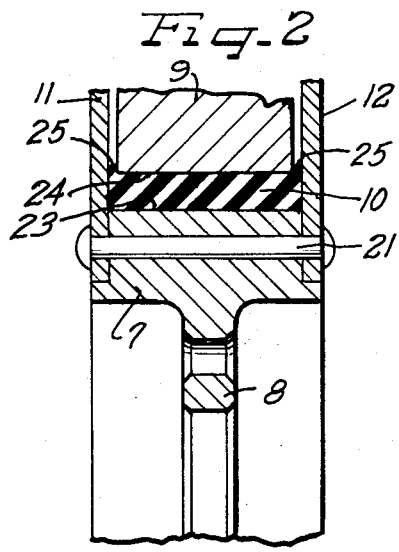
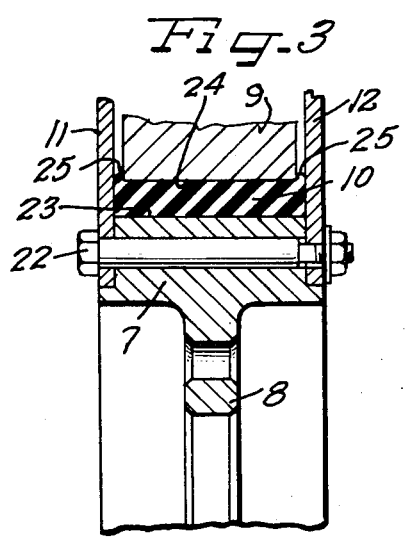
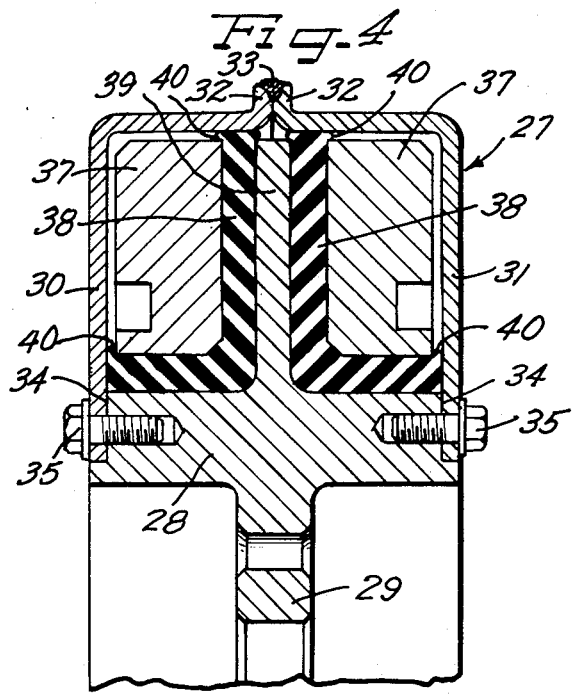
INVENTOR.
Jeffrey Hall
ATTORNEYS

METHOD OF MAKING TUNED TORSIONAL VISCOUS VIBRATION DAMPERS

The present application is a division of my application Ser. No. 780,779, filed Dec. 3, 1968, now U.S. Pat. No. 3,603,172.

This invention relates to a method of making dampers of the type adapted, for example, to be mounted on the end of the crank shaft of a reciprocating piston internal combustion engine.

In torsional vibration dampers of the type employing viscous damping fluid between opposed shear film spaced working surfaces of the inertia mass and the housing, one of the problems has been to maintain the surfaces of the members against rubbing upon one another. Another problem has been to overcome unusual or critical vibrational nodes in the crank shaft and desirably overcome by tuning the damper to the particular vibrational frequency.

The foregoing problems are readily met by a damper made according to the principles of the present invention in which the inertia mass is bonded by an elastomeric element to a hub and with at least one portion of the elastomeric element providing a spacer between adjacent working surfaces of the inertia member and the housing.

Another problem which is encountered in curing the elastomeric element as by vulcanization to bond the same to the inertia mass and the hub is that some of the material may lap over onto a working surface of the inertia member.

In accordance with the principles of the present invention the excess overlapping material may be trimmed away, but leaving some of such material to serve as a spacer and a seal between the adjacent working surface of the inertia member and the housing of the damper.

It is accordingly, an object of the present invention to provide a new and improved method of making tuned torsional viscous vibration dampers.

Another object of the invention is to provide a method of making a tuned viscous vibration damper having an elastic tuning element which serves also as a spacer for the inertia mass with respect to the housing of the damper.

A further object of the invention is to provide a new and improved damper method of making a construction in which an elastic tuning element also provides a seal against leakage of viscous damping fluid from within the damper.

Still another object of the invention is to provide a new and improved method of making a tuned viscous vibration damper involving in situ molding of elastic tuning material.

Other objects, features and advantages of the present invention will be readily apparent from the following detailed description of certain exemplary embodiments thereof taken in conjunction with the accompanying drawing in which:

FIG. 1 is a fragmentary radial sectional detail view through a tuned torsional viscous vibration damper embodying features of the invention;

FIG. 2 is a fragmentary sectional view similar to FIG. 1 but showing a modification;

FIG. 3 is a similar sectional view showing another modification; and

FIG. 4 is a similar sectional view showing yet another modification.

On reference to FIG. 1, a torsional vibration damper 5 made according to the method of the invention comprises a generally ring-shaped hub 7 having a radially inwardly extending flange 8 by which the damper is adapted to be attached to one end of or to a flange on a rotary member subject to torsional vibrations, such as a crank shaft of an internal combustion engine and more particularly a reciprocating piston engine. Mounted in spaced concentric relation about the hub 7 is a ring shape inertia mass 9 connected in spaced relation to the hub by a tuning spring elastic element 10 which is of complementary ring shape and is bonded to the confronting radially outwardly facing surface of the hub 7 and the radially inwardly facing surface of the inertia ring 9 and is of such mass and resilient qualities relative to the inertia mass and the vibratory member on which the damper is to be mounted as to damp vibrations of a critical node or frequency.

Mounted on the hub 7 and enclosing the inertia mass 9 is a housing which may desirably be constructed of suitable gauge sheet metal parts, comprising complementary half shells 11 and 12 each of which comprises a radial wall portion having its inner margin seated in a respective rabbet 13 grooved in the adjacent end of the hub 7, with the edge of the housing member secured, in this instance, permanently to the hub as by means of welding 14. At their outer perimeters, the housing shell member 11 and 12 have respective axially extending flange portions with radially extending confronting respective joint flanges 15 which are hermetically joined as by means of welding 17.

By having the width between the axially facing surfaces of the rabbets 13 sufficiently greater than the width of the inertia mass 9, and the inside faces of the housing members 11 and 12 conforming to the width of the hub portion between the inner margins of the housing member a shear film spaced relationship is accommodated between the confronting working faces of the sides of the inertia mass and the housing. A shear film spaced relationship between the outer perimeter of the inertia mass 9 and the housing is predetermined also. The viscous damping fluid is filled into the working chamber in the housing through one or more filler openings 18 which are then sealed by a plug 19. To increase the fluid capacity of the chamber, the inertia ring 9 may have one or more reservoir spaces 20. The damping fluid may be silicone liquid of suitable viscosity, i.e. $0.5 \times 10^6$ to $1 \times 10^6$ centistokes.

Instead of welding the housing shell members 11 and 12 to the hub 7 as shown in FIG. 1, the inner margins of the housing members may be secured to the hub member by means such as rivets 21 as shown in FIG. 2.

If preferred, the inner margins of the housing members 11 and 12 may be secured to the hub 7 by means such as bolts 22 as shown in FIG. 3.

In the assembling of the arrangements shown in FIGS. 1, 2 and 3, the inertia mass 9 and the hub member 7 are held in the relative position thereof shown in the drawing with a suitable quantity or blank of the material of the elastic tuning and spacer element 10 in place in the space therebetween. The material of the elastic element is then cured, as by heating and vulcanizing the same, whereby it fills the space and bonds to confronting faces 23 and 24 of respectively the hub and the inertia mass. To permit relief or flash of excess material during curing, mold surfaces may be applied to the axially facing surfaces of the rabbets 13 whereby the mold surfaces are held spaced from the axially facing working surfaces of the inertia mass member 9. After molding has been completed, excess flash is removed from the axial faces of the inertia member except that a small amount of the material of the elastic element is desirably left as an annular sealing and spacer flange 25 to extend into the space between the inner margins of the inertia ring 9 and the housing members 11 and 12. If preferred, the axial dimension of the inertia ring may be molded to a slightly greater length than in the final assembly, as indicated in dash outline in FIG. 1 and after trimming back of the flash, and seating of the housing members 11 and 12 in the rabbets 13, the material of the elastic element 10 may be compressed to the full line position shown whereby the sealing and spacer ring flanges 25 will result from the flow of the compressed material into the working spaces between the inertia member and the housing. In any event, the flanges 25 maintain an axially spaced relation of the inertia ring member 9 in the housing chamber and the tuning spring elastic element 10 maintains a concentric spaced relation of the inertia ring with respect to the radially facing working surfaces of the housing and the inertia member.

After the cover members 11 and 12 have been applied and secured together and onto the hub and the viscous damping fluid filled into the working chamber, and the plugs 19 applied, the damper is ready for use. The elastic element 10 not only serves as a spacer for the inertia mass 9 but also acts as a seal to prevent egress of the viscous fluid from the damper and as a tuning spring.

In FIG. 4 a damper 27 according to the invention comprises a ring shaped hub 28 having a centrally located radially extending attachment flange 29. The cover or housing comprises two complementary shell members 30 and 31 which have outer terminal joint flanges 32 welded hermetically as at 33. At their inner margins the cover members 30 and 31 are seated in respective rabbets 34 in the opposite ends of the hub 28 and may be secured in any suitable manner, as by means of screws 35. In this instance two similar inertia ring members 37 are mounted by being bonded to respective generally L-shaped cross section annular elastic tuning elements 38 at surfaces thereof which oppose spaced confronting surfaces of the hub 28 which is provided with a radially outwardly extending central annular attachment fin of flange 39 for this purpose. In this instance the opposite ends of each of the elastic tuning elements 38 engage sealingly with the housing and have sealing and spacer flanges 40 extending a limited distance into the shear film spacings between the confronting working surfaces of the inertia ring members and the housing members.

Assembly of the arrangement shown in FIG. 4 is similar to assembly of the arrangements shown in FIGS. 1 – 3.

The present invention thus provides a combined rubber damper and viscous damper which is, in fact, a viscous damper with a tuned inertia mass.

The damper of the invention is advantageous in that the surfaces of the inertia member, cover member and hub member which are not bonded to the elastic element are accessible until the hub member and the cover member are assembled, thus enabling excess elastic material to be removed from those surfaces to which it is not intended to be bonded. If this scrap is not removed, then the surfaces available for shear action are reduced with a corresponding reduction in the damping effect of the unit.

Another advantage of the present invention is that, since the inertia mass is located by the elastic element, larger clearances between the inertia mass and the cover member may be possible than in purely viscous dampers. For example clearances of upwards of 0.020 inches may be used. Also, because there is less chance of fouling between the inertia mass and the cover, due to the extra-location of the inertia member provided by the elastic element, the casing may be made from thinner materials than are generally necessary in purely viscous dampers. The use of thinner materials results in less hub inertia.

In any form of the invention the hub member and the cover member may be manufactured from many materials, for example steel or cast iron. Where cast iron is used, the hub member and the cover member should be bolted, rivetted or screwed together. Where steel is used, welding may also be used to attach the cover member to the hub member. The inertia mass is preferably made from cast iron or steel. If desired the cover member may be a multiple part member, and in one preferred embodiment of the invention the cover member is a two part member.

In all forms of the invention, the surfaces of the elastic elements engaging the housing sealingly are desirably in sliding engagement therewith such that viscous damping relative torsional movements of the inertia mass and the housing are facilitated in the normal operation of the damper and excellent elastic tuning is attained.

It will be appreciated that many modifications are possible in the arrangements shown in the drawings. For example the elastic elements of FIGS. 1 – 3 could be L-shaped cross section, the chamber being defined between a cover member of L-shaped cross section and a hub member including a flange which would take the place of one of the radially extending walls of the cover member in FIGS. 1 – 3. The L-shaped elastic element could be located between the inertia mass and the hub member or between the inertia mass and the cover member.

I claim as my invention:

1. A method of making a tuned torsional viscous vibration damper comprising:
   holding a circular hub and a ring-shaped inertia member in concentric spaced relation;
   placing uncured elastic material in the space between the hub and the inertia ring;
   curing the elastic material into an elastic element and permitting flash to move onto axially facing surfaces of the inertia ring;
   trimming away at least most of said flash;
   assembling housing members onto opposite ends of said hub and in confronting relation to said inertia ring;

engaging flanges from said elastic element as spacers between confronting working surfaces of said inertia ring and said housing members; and filling a working chamber within the housing with viscous damping fluid.

2. A method according to claim 1, which comprises trimming all of the flash except said flanges after the curing of the elastic material has been completed.

3. A method according to claim 1, comprising molding the elastic element slightly longer than in the assembly, and compressing the elastic element and squeezing and flowing said flanges into the spaces between said working surfaces.

4. The method according to claim 1, comprising applying said housing members to said elastic element in freely slidable relation.

5. A method of making a tuned torsional viscous vibration damper comprising:

holding a circular hub and a ring-shaped inertia member in concentric spaced relation;

placing uncured elastic material in the space between the hub and the inertia ring;

curing the elastic material into an elastic element and permitting flash to move onto at least one axially facing surface of the inertia ring;

trimming away at least most of said flash;

assembling housing structure onto said hub and in confronting relation to said inertia ring surface;

engaging a flange from said elastic element as a spacer between said inertia ring surface and a confronting working surface of said housing structure; and filling viscous damping fluid into a working chamber within the housing including the space between said surfaces.

6. A method according to claim 5, comprising trimming all of the flash except said flange after curing of the elastic material has been completed.

7. A method according to claim 5, comprising molding the elastic element slightly longer than in the assembly, and compressing the elastic element and squeezing and flowing said flange into said space.

8. A method according to claim 5, comprising applying said housing structure to said elastic element in freely slidable relation.

9. A method of making a tuned torsional viscous vibration damper comprising:

assembling relatively torsionally movable members, one of which is an inertia mass, together into predetermined spaced relation;

bonding elastic spacer and tuning material to and between said members;

assembling additional structure with said members to provide an enclosed working chamber wherein said structure and one of said members have confronting complementary working surfaces;

engaging a spacer of said material between said working surfaces to maintain said working surfaces in predetermined spaced relation in said chamber; and filling viscous damping fluid into said chamber and between said surfaces.

10. A method according to claim 9, wherein said one of said members and said housing structure have a plurality of complementary working surfaces, and respective spacers of said material maintaining all of said complementary surfaces in spaced relation.

11. A method according to claim 9, wherein said spacer comprises a flange of limited width, and squeezing said flange into sealing engagement between said surfaces.

12. A method according to claim 9, comprising forming said spacer as a flash flange in curing said material.

13. A method according to claim 9, comprising molding said material into an elastic element slightly longer than the intended space between said surfaces, and compressing the elastic element and squeezing and flowing a flange thereof into said space to provide said spacer.

14. A method according to claim 9, comprising applying one of said surfaces to said spacer in freely slidable relation.

* * * * *